C. L. W. Baker,

Mop.

No. 106,986. Patented Sep. 6. 1870.

Witnesses:

Inventor.
C. L. W. Baker

United States Patent Office.

CHARLES L. W. BAKER, OF HARTFORD, CONNECTICUT.

Letters Patent No. 106,986, dated September 6, 1870; antedated August 25, 1870.

IMPROVED MOP.

The Schedule referred to in these Letters Patent and making part of the same.

To all whom it may concern:

Be it known that I, CHARLES L. W. BAKER, of the city and county of Hartford and State of Connecticut, have invented certain new and useful Improvements in the Manufacture of Mops; and to enable others skilled in the art to make the same, I will proceed to describe, referring to the drawing, in which the same letters indicate like parts in each of the figures.

The nature of this invention consists in securing hollow tufts of woven or braided fabric material in a block nearly after the manner of securing bristles in a block, as a new improvement in the manufacture of mops.

In the accompanying drawing—

Figure 1:
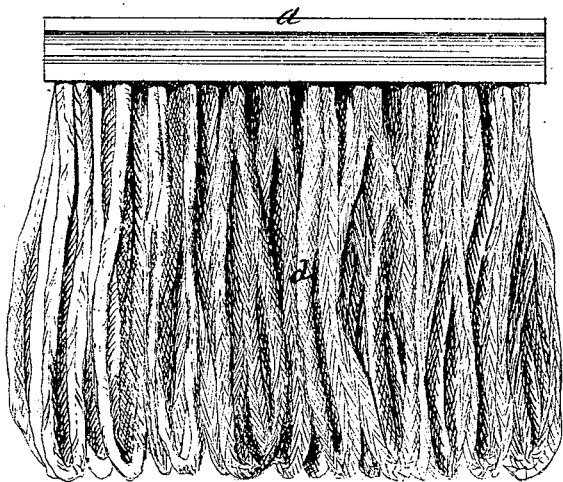
Figure 1 is a side view.
Figure 2:
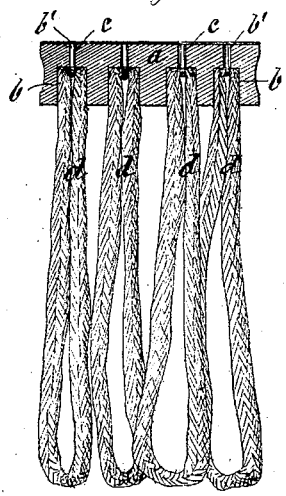
Figure 2 is an end section view.

$a$ is a mop-head, made of any suitable material, as wood, and of any desirable length, width, or thickness, the edges being curved out, to receive a clasp scrub-handle fastening, for the purpose of handling or using the mop; or a handle may be inserted in the center of the head, when desirable, by forming an orifice therefor.

This block $a$ is provided with orifices $b$, which are formed half or three-fourths of the thickness (more or less) of the block $a$, and of sufficient diameter to receive the body of the material which forms the mop.

Smaller holes $b'$ extend from these orifices through the block, by means of which a cord or wire, $c$, is doubled and passed through the small hole and orifice through the block in the form of a loop, and the center of the strands which compose one tuft is placed therein, and the whole tuft thus secured is pulled up into and held firmly in said orifice by said cord or wire, one at a time, successively, until all of the orifices are filled, much after the manner of securing bristles in a brush, wood or head, after which the outer surface is covered with wood or paper, &c., to give it a finished appearance.

The material $d$ of which this mop is composed is one continuous hollow strand of woven or braided fabric, of several yards in length in a piece, more or less, as convenient, thus avoiding tangling and waste of material, and, at the same time, produce a superior article for use and trade.

I believe I have thus shown the nature, construction, and advantage of this invention so as to enable others skilled in the art to make and use the same therefrom.

What I claim as my improvement in mops is—

Its construction from hollow or braided material or fabric $d$, block $a$, cord or wire $c$, as an article of manufacture, as shown and set forth.

C. L. W. BAKER. [L. S.]

Witnesses:
E. W. BLISS,
JEREMY W. BLISS.